June 17, 1969     W. FARNWORTH     3,450,442
PNEUMATIC CONVEYING LINE ELBOW APPARATUS
Filed May 13, 1966     Sheet 1 of 2
PRIOR ART
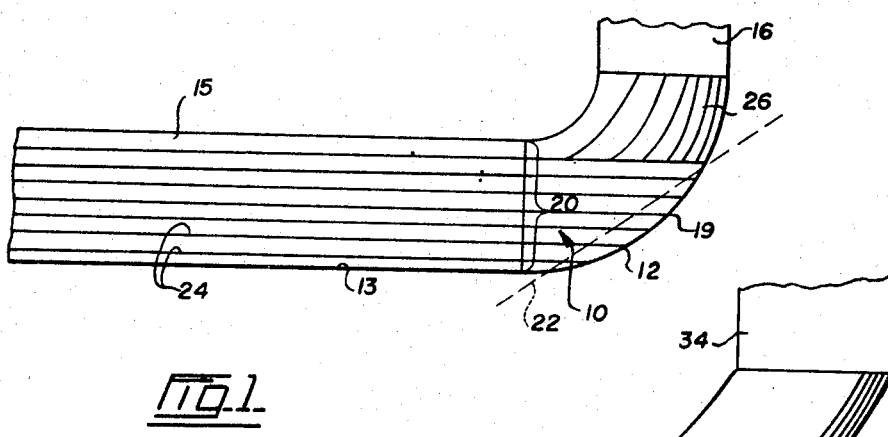
Fig. 1
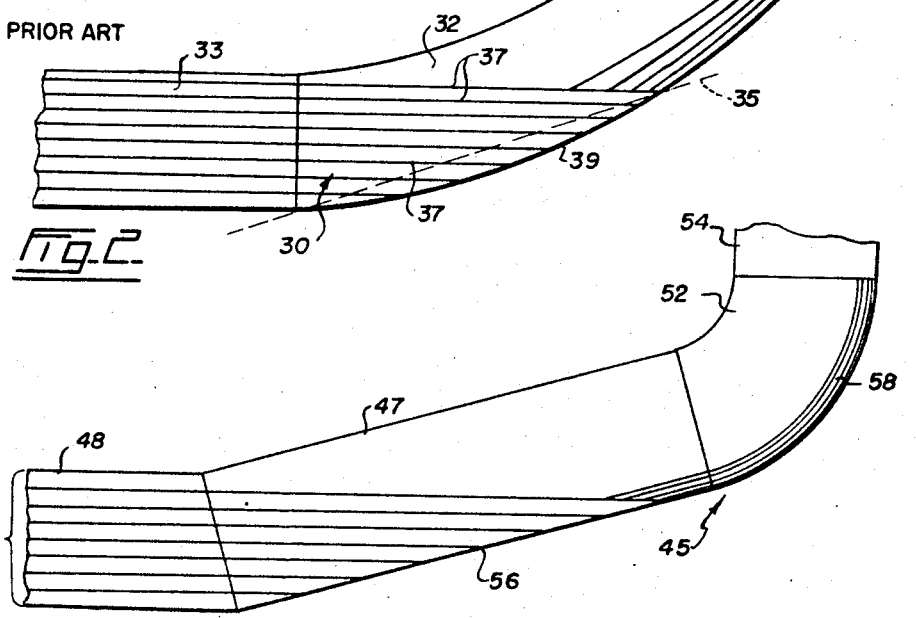
Fig. 2
Fig. 3
INVENTOR
WILFRED FARNWORTH
BY
Fetherstonhaugh & Co
ATTORNEYS

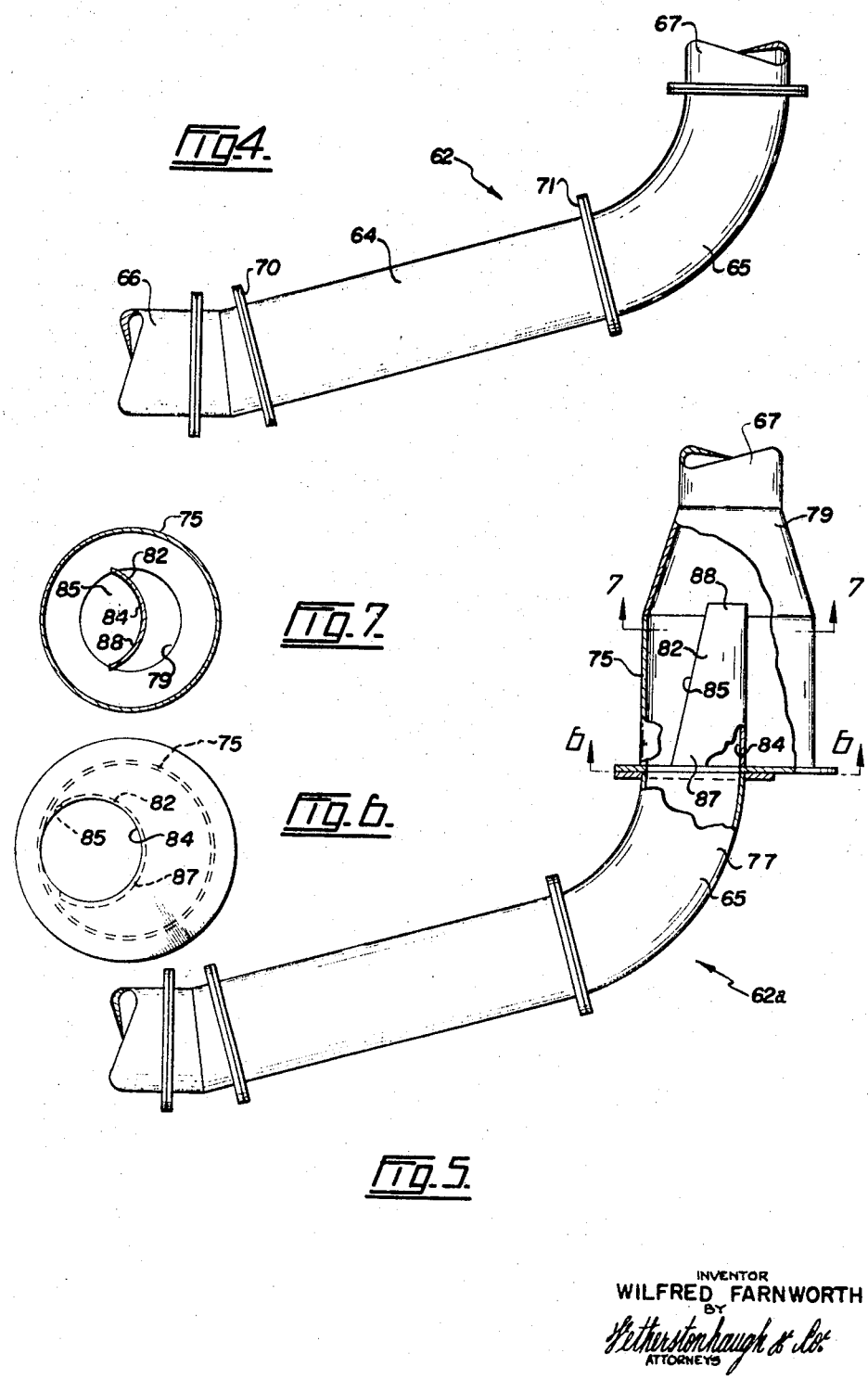

United States Patent Office 3,450,442
Patented June 17, 1969

3,450,442
PNEUMATIC CONVEYING LINE
ELBOW APPARATUS
Wilfred Farnworth, North Vancouver, British Columbia, Canada, assignor to Rader Pneumatics & Engineering Co. Ltd., Burnaby, British Columbia, Canada
Filed May 13, 1966, Ser. No. 549,843
Int. Cl. B65g 53/52; F16l 43/00
U.S. Cl. 302—64                                    8 Claims

ABSTRACT OF THE DISCLOSURE

Elbow apparatus for a particulate material pneumatic conveying line, comprising a straight pipe section inclined relative to an inlet conveying pipe at one end of this section, said straight section being inclined at a low impact loss angle and being sufficiently long to extend across substantially the full projected area of the inlet pipe, and a curved pipe section connected to the opposite end of said straight section, the curve of the curve section and the incline of the straight section combined being such as to provide a desired degree of turn in the conveying line.

---

This invention relates to elbow apparatus for pneumatic conveying pipe lines for turning particulate material moving along these lines through desired degrees of turn.

An object of the present invention is the provision of apparatus for directing particulate material around comparatively sharp turns in pneumatic conveying lines without causing piling up of the material or excessive loss of energy at the turns, and with a minimum amount of wear on the conveying lines at the turns.

Prior to the present invention, problems existed relative to the directing of particulate material around comparatively sharp turns in pneumatic conveying lines. The idea of using short radius elbows in pneumatic conveying lines has been tried many times without success. This is mainly because the impact loss is very severe and the velocity of material is greatly reduced at the turn. This results in a tendency of the material to pile up at the turn and plug the line. In addition, the wear on the elbow and damage to the conveyed material are very great.

Up until now long radius elbows have been used in conveying lines because they reduce the possibility of plugging the line and hence the pneumatic conveying system is more stable. However, the energy loss round such elbows is so great as to reduce the velocity of material to an undesirable extent. This is due mainly to the fact that the material is travelling around a comparatively long curve during which time centrifugal forces are acting and this is in addition to the initial impact losses.

The advantage of using short radius elbows in these conveying lines are that these can be made much more cheaply than long radius elbows and that they produce a smaller loss of kinetic energy of the conveyed material if the latter can be directed into the elbow in a certain way. In comparing the radii of elbows, a short radius would be of a length less than three pipe diameters and the long radius would be any length greater than this, usually about ten diameters in pneumatic conveying pipe lines. The preferred short radius is one and a half pipe diameters because this is one which manufacturers produce as standard items for fluid pipe lines.

Elbow apparatus according to the present invention directs particulate material around a comparatively sharp turn in a pneumatic conveying line in which said apparatus is connected and without causing piling up of the material or excessive loss of energy at the turn, and with a minimum amount of wear on the conveying line at said turn. This elbow apparatus includes a straight pipe section inclined relative to an inlet conveying pipe, said straight section being inclined and sufficiently long to extend across substantially the full projected area of said inlet pipe at an angle which produces reasonably low impact losses. A curved pipe section is connected to the opposite end of this straight section, the curve of the curved section being such that said sections combined provide the desired degree of turn in the conveying line and still remain within the space limits that would be required by a long radius elbow of the prior art. The inclined straight pipe section acts as the impact area and deflects the particulate material around this part of the turn without centrifugal loss. In addition, this straight pipe section can be rotated around its longitudinal axis so that the surface thereof receiving the full impact of the particulate material can be changed, thereby greatly lengthening the life of the elbow apparatus.

The elbow apparatus is further improved by providing an elongated expansion chamber at the outer end of the curved section of said apparatus, said chamber having an outlet at the end thereof remote from the curved section. The curved section has an outer longitudinally curved surface along which particulate material moves positioned relative to the expansion chamber to direct the particulate material substantially centrally through the said chamber towards the outlet thereof, thus ensuring good re-entrainment of the material after passing round the elbow. The apparatus is further improved by providing a tubular guide in the expansion chamber extending substantially longitudinally and centrally thereof. This guide has a containing surface extending from said curved surface of the curved section towards the chamber outlet.

Examples of this invention are illustrated in the accompanying drawings, in which:

FIGURE 1 diagrammatically illustrates the action of particulate material moving through a short radius elbow, FIGURE 2 is a view similar to FIGURE 1 illustrating the action of particulate material in a long curved elbow, FIGURE 3 is a view similar to FIGURE 1 illustrating the action of particulate material in elbow apparatus of the present invention, FIGURE 4 is a side elevation of one form of the present invention, FIGURE 5 is a side elevation, partly in section, of an alternative form of this invention, FIGURE 6 is a cross section taken on the line 6—6 of FIGURE 5, and FIGURE 7 is a cross section taken on the line 7—7 of FIGURE 5.

Referring to the drawings, FIGURE 1 diagrammatically illustrates a short radius elbow apparatus 10 being used for turning particulate material through a desired degree of turn, for example, 90°. Apparatus 10 comprises a short radius elbow 12 in a pneumatic pipe line 13. The line includes an inlet section 15 extending to the elbow, and an outlet section 16 extending away from said elbow. The illustrated elbow is a 90° elbow, and the curved outer surface 19 thereof extends across the projected area of the inlet section or pipe 15, said inlet section being indicated by the numeral 20. Line 22 represents the average impace plane of the particulate material directed into elbow 12 by pipe section 15. The particulate material is directed against the portion of the curved outer surface 19 of the elbow which extends across the projected area of inlet section 15. The particulate material is directed substantially straight towards said curved surface, as indicated by lines 24, and said surface abruptly changes the direction of movement of the particulate material and directs it generally towards outlet pipe section 16. However, as surface 19 is curved, the particulate material is subjected to high centrifugal force as well as impact loss as a result of the abrupt change of direction. As a result of this, the material loses velocity and tends to pile up at 26 near the outlet end of elbow 12, and this causes plugging of the line. Furthermore, as the curved surface 19 receives the full impact of the particulate material, it wears out very rapidly, necessitating the replacing of the elbow.

In the past, in order to prevent the plugging of the conveying line use has been made of long radius elbow apparatus, such as illustrated in FIGURE 2. Elbow apparatus 30 of FIGURE 2 includes a long radius elbow or curved section 32 extending from an inlet section or pipe 33 to an outlet section or pipe 34. Line 35 indicates the average impact plane of particulate material moving into elbow 32 in the direction indicated by lines 37. The angle of inclination of this plane is considerably less than that of apparatus 10 so that impact losses are less. Here again, the patriculate material strikes the outer longitudinal curved surface 39 of the curved or elbow section so that said material is subjected to relatively high centrifugal force, although this force is less than that generated in apparatus 10. After changing direction along the curved surface 39, the material still has to travel a fairly long distance around the curve as indicated at 40, during which time it is still subjected to centrifugal force. Thus, there is considerable energy loss due to centrifugal force at every point in the elbow in addition to the initial impact loss.

FIGURE 3 illustrates elbow apparatus 45 incorporating the present invention. Apparatus 45 includes a straight pipe section 47 which is inclined relative to an inlet section or pipe 48 of a conveying line. The incline of straight section 47 is such that said section extends across substantially the full projected area of inlet pipe 48, said projected area being indicated by numeral 49. In the illustrated form of the invention, the inclined straight section just extends over the full projected area of pipe 48, but it will be understood that it may extend across a little more or less than the full projected area. It has been found in actual practice that the best results are attained if the angle of incline relative to pipe section 48 is between 10° and 15°, but the results are still satisfactory if this range is extended to include angles between 5° and 30°. Above 30° the impact losses become too great and below 5° the inclined section may become too long and cancel the advantages gained in this type of elbow. A curved pipe section 52 is connected to and extends away from the opposite end of straight section 47. The curve of section 52 is such that the sections 47 and 52 combine to provide the desired degree of turn in the pneumatic conveying line. Curved section 52 is connected to an outlet section or pipe 54 of the conveying line. The whole unit occupies considerably less space than a conventional long radius elbow for the same degree of turn.

The particulate material is directed by inlet section 48 against the longitudinally straight surface 56 of inclined section 47, said surface being inclined relative to the longitudinal axis of pipe section 48. The direction of movement of the particulate material is changed, but it is a sudden angular change immediately after which there is no centrifugal force since surface 56 is straight in a longitudinal direction. Inclined section 47 causes the particulate material to slide rather than impact into curved section 52 where the bulk of the material slides along the outer curved surface 58 of said curved section. The material is subjected to centrifugal force in section 52, but only for a relatively short distance as compared to the long curve of curved section 32 of elbow apparatus 30. In addition, there is no impact loss in section 52 while the material is being subjected to centrifugal force, since the impact which results in the initial change of direction of the particulate material flowing from pipe 48 takes place in inclined section 47. Thus, the initial change of direction of the particulate material is made in section 47 where, owing to the longitudinal straightness of said section, centrifugal force is not involved. Centrifugal force does affect the material in curved section 52, but impact force does not. It has been found that energy loss by the material has been greatly reduced in bends in conveying lines by elbow apparatus 45.

FIGURE 4 illustrates a practical application of the apparatus of FIGURE 3. Elbow apparatus 62 includes the inclined straight section 64 and the curved section 65 connected to the downstream end thereof. An inlet pipe or section 66 leads to the inlet end of inclined 64, while an outlet pipe or section 67 extends away from curve section 65. The practical part of this apparatus is that all or most of straight section 64 is connected by parallel flanges 70 and 71, at opposite ends thereof respectively to the inlet pipe section of the conveying line and the curved section 65 of the elbow apparatus. As a result of this, section 64 can be rotated around its longitudinal axis as wear takes place on the surface of said section against which the incoming particulate material is directed. Thus, as wear takes place in a portion of the straight section, the latter can be rotated to bring another section of its surface into line with the end of inlet pipe section 66.

FIGURE 5 illustrates apparatus 62a which is an improvement over apparatus 62. In apparatus 62a outlet pipe section 67 is disconnected from curved section 65, and an elongated expansion chamber 75 is connected thereto. Chamber 75 has a larger diameter than that of curved section 65, and the former is so located relative to the latter that the outer curved wall or surface 77 of the surved section is positioned to direct particulate material travelling along said surface substantially centrally through chamber 75 towards an outlet end 79 thereof which is connected to outlet pipe or section 67. The curved surface 77 of elbow section 65 is substantially aligned with the longitudinal axis of chamber 75 and outlet pipe 67. The particulate material moving along said surface 77 is directed centrally through the expansion chamber and into pipe 67 centrally thereof. The conveying air passing from curved section 65 expands in chamber 75 and surrounds the material in said chamber so that the material is conveyed by said air through pipe 67 along the longitudinal axis thereof.

Apparatus 62a is further improved by a tubular guide 82 in expansion chamber 75 extending substantially longitudinally and centrally thereof. Guide 82 has a containing surface 84 extending from curved surface 77 of section 65 towards chamber outlet 79. Tubular guide 82 preferably has an opening 85 extending the length thereof along the side opposite containing surface 84. In the preferred form of the invention, tubular guide 82 is substantially circular in cross section at the end 87 thereof near curved section 65 and gradually changes to a substantially U cross section at the opposite end 88 of the guide, see FIGURES 6 and 7.

With this arrangement, the particulate material sliding along the outer curved surface 77 of curved section 65 is directed into guide 84 and moves along the containing surface 84 thereof which directs said material through the expansion chamber 75 centrally thereof and substantially along the longitudinal axis of outlet pipe section 67. The air entering the chamber from pipe section 65 expands in said chamber, some entering guide 82, and the remainder surrounding said guide and the particulate material as the latter emerges from the guide so that the air and material travelling in substantially the same direction at entry to the pipe section 67. Since the particulate material is in the central portion of the pipe and travelling axially along this pipe, good re-entrainment is ensured.

What I claim as my invention is:

1. Elbow apparatus for a pneumatic conveying line for turning particulate material moving along said line through a desired degree of turn, comprising a straight pipe section inclined relative and connected to an inlet conveying pipe at one end of said straight section, said pipe section having a smooth, unobstructed surface opposite said inlet pipe throughout its length and against which surface material conveyed into said straight section from said inlet pipe will impinge, said straight pipe section being inclined at a low impact loss angle of less than about thirty degrees and being sufficiently long to extend across the full projected area of said inlet pipe, and a curved pipe section connected to the opposite end of said straight section, the curve of said curved section being such that said sections combined provide the desired degree of turn in the conveying line.

2. Elbow apparatus as claimed in claim 1 in which the angle of incline of the straight pipe section to the inlet pipe ranges from 5° to 30°.

3. Elbow apparatus as claimed in claim 1 in which the straight pipe section is rotatable around the longitudinal axis thereof relative to the curved section.

4. Elbow apparatus as claimed in claim 1 including an elongated expansion chamber connected at one end thereof to the end of said curved section remote from the pipe section, said chamber having an outlet at the opposite end thereof, and said curved section having an outer longitudinally curved surface along which particulate material moves positioned relative to the expansion chamber to direct said particulate material centrally through said chamber toward the outlet thereof.

5. Elbow apparatus as claimed in claim 4 including a tubular guide in said expansion chamber extending substantially longitudinally and centrally thereof, said guide having a containing surface extending from said curved surface of the curved section toward the chamber outlet.

6. Elbow apparatus as claimed in claim 5 in which said tubular guide is open along a side thereof opposite the guide containing surface.

7. Elbow apparatus as claimed in claim 5 in which said containing surface of the tubular guide extends along substantially the axial centre of the chamber outlet.

8. Elbow apparatus as claimed in claim 6 in which said tubular guide is substantially circular in cross section at the end thereof near said curved section and gradually changes to a substantially U cross section towards the opposite end of the guide.

References Cited

UNITED STATES PATENTS

| 1,827,727 | 10/1931 | Blizard | 302—64 |
| 2,276,883 | 3/1942 | Schon et al. | 285—150 X |
| 2,529,685 | 11/1950 | Ginter | 285—184 X |
| 2,587,170 | 2/1952 | Klingler et al. | 285—179 X |
| 2,756,076 | 7/1956 | Rodriguez | 285—179 X |
| 3,337,273 | 8/1967 | Farnworth | 302—64 |

FOREIGN PATENTS

| 684,220 | 11/1939 | Germany. |
| 805,469 | 5/1951 | Germany. |
| 215,806 | 5/1924 | Great Britain. |
| 926,865 | 5/1963 | Great Britain. |
| 337,056 | 2/1936 | Italy. |

CARL W. TOMLIN, *Primary Examiner.*

D. W. AROLA, *Assistant Examiner.*

U.S. Cl. X.R.

285—179